United States Patent [19]
Sano et al.

[11] 4,152,011
[45] May 1, 1979

[54] CHARACTERISTIC COMPENSATING DEVICE FOR AIR SPRINGS FOR AUTOMOTIVE SUSPENSION USE

[75] Inventors: Shoichi Sano, Tokorozawa; Noriyuki Takahashi, Tokyo; Goro Urushiyama; Seiji Kasai, both of Ooi; Toshihiko Aoyama, Wako; Tokuro Takaoka, Tokyo, all of Japan

[73] Assignee: Honda Giken Kogyo Kabushiki Kaisha, Tokyo, Japan

[21] Appl. No.: 839,121

[22] Filed: Oct. 3, 1977

[30] Foreign Application Priority Data

Oct. 9, 1976 [JP] Japan ................................. 51-121481

[51] Int. Cl.² .............................................. B60G 11/18
[52] U.S. Cl. ......................................... 280/723; 267/57
[58] Field of Search ........................... 280/723; 267/57

[56] References Cited
U.S. PATENT DOCUMENTS

| | | | |
|---|---|---|---|
| 3,207,497 | 9/1965 | Schoonover | 280/723 |
| 3,615,081 | 10/1971 | Ravenel | 280/723 |
| 3,778,082 | 12/1973 | Grosseau | 280/723 |

*Primary Examiner*—Philip Goodman
*Attorney, Agent, or Firm*—Haseltine, Lake & Waters

[57] ABSTRACT

A device including a torsion bar rotatably mounted on the vehicle frame transversely thereof and a pair of rock arms extending integrally from the opposite ends of the torsion bar at right angles thereto and connected with a right and a left wheel, respectively. An abutment arm is fixed to the torsion bar at the middle thereof and engageable with a stop pad provided on the vehicle frame, when either or both of the wheels are moved down, to restrain further downward movement thereof. Thus, the spring rate of air springs associated with the respective wheels is in effect increased as the loads thereon are reduced, particularly in a lower load region.

2 Claims, 4 Drawing Figures

CHARACTERISTIC COMPENSATING DEVICE FOR AIR SPRINGS FOR AUTOMOTIVE SUSPENSION USE

BACKGROUND OF THE INVENTION

This invention relates to air-suspension systems used on vehicles such as automobiles and more particularly to devices designed to compensate the operating characteristics of the air springs in such automotive suspension system.

In general, an air spring inherently has a spring rate which increases with increase in amount of the load applied thereto, as illustrated in FIG. 3 of the accompanying drawings by the line a. Such spring characteristic is advantageous in that it makes it possible to support high loads smoothly without impairing riding comfort of the vehicle but is disadvantageous, incurring different undesirable phenomena which reduce the driving stability of the vehicle. Specifically, in the lower load region, the spring rate is extremely reduced to increase the rate of change in spring stroke relative to change in load. Because of this, for example, when the vehicle is suddenly braked and the loads on the rear wheels are accordingly rapidly reduced, the air springs associated with the rear wheels are allowed to expand to such a large extent that the phenomenon of "tail lift", that is, the floating up of the rear portion of the vehicle body, occurs in a conspicuous fashion. Also, during turning movement of the vehicle, as the loads on the inside and outside wheels are, respectively, decreased and increased under the effect of the centrifugal force acting on the vehicle, the air springs associated with the inside wheels are allowed to expand in an amount larger than that in which the air springs associated with the outside wheels are compressed and thus the rolling movement of the vehicle body is intensified.

SUMMARY OF THE INVENTION

The present invention is intended to overcome the difficulties previously encountered with automotive air suspension systems as described above and has for its object the provision of a novel device which is usable in an automotive air suspension system to compensate the spring rate of air spring assemblies employed therein particularly in a lower load region and is simple in construction.

According to the present invention, there is provided in a vehicle of the type including a pair of right and left wheels suspended on the frame of the vehicle through the medium of respective air spring assemblies a characteristic compensating device for the air spring assemblies which comprises a single torsion bar rotatably mounted on the frame of the vehicle transversely thereof, a pair of rock arms extending integrally from the opposite ends of said torsion bar and connected with the respective wheels, and rotation limiting means for limiting rotation of the middle section of said torsion bar as occurring with downward movement of at least one of the wheels with respect to the frame of the vehicle to a predetermined angular extent.

The above and other objects, features and advantages of the present invention will become apparent from the following description when taken in conjunction with the accompanying drawings, which illustrate a preferred embodiment of the invention.

DESCRIPTION OF THE PREFERRED EMBODIMENTS

Figure 1:
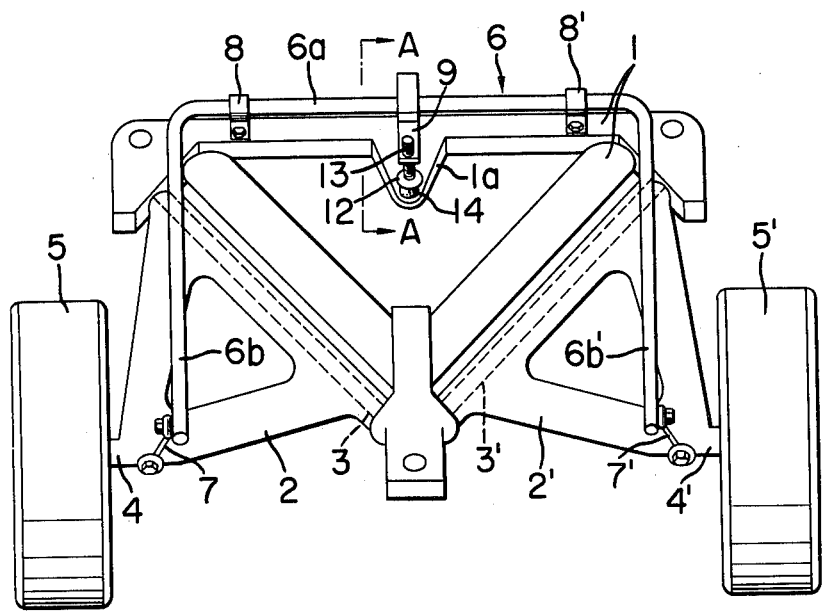
FIG. 1 is a plan view of one preferred embodiment of the present invention.

Referring to the drawings and first to FIG. 1, reference numeral 1 indicates a rear subframe which forms part of the frame of the vehicle. A pair of left and right suspension arms 2 and 2' are pivotally supported on the subframe 1 as at 3 and 3' for vertical rocking movement and are provided at their extremities with respective wheel axles 4 and 4'. A pair of rear wheels 5 and 5' are mounted on the respective axles 4 and 4' and are connected through the respective suspension arms 2 and 2' with air springs, not shown.

Reference numeral 6 indicates a stabilizer which is connected at the opposite ends to the base portions of the respective wheel axles 4 and 4' by means of links 7 and 7'. As shown, the stabilizer 6 comprises a torsion bar 6a extending transversely of the frame of the vehicle or in parallel with the aligned axes of wheel axles 4 and 4' and a pair of left and right rock arms 6b and 6b' which extend integrally from the opposite ends of the torsion bar 6a at right angles thereto and connected with links 7 and 7', respectively. As observed, the stabilizer 6 takes the form of a U-shaped one-piece member.

Figure 2:
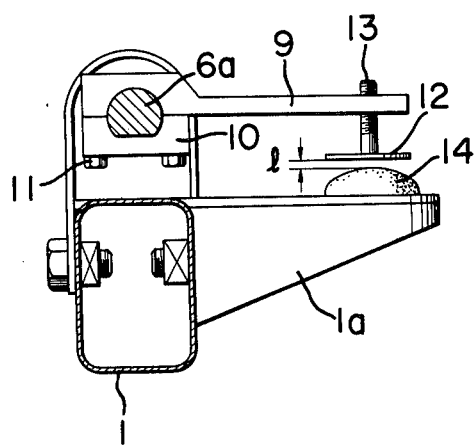
FIG. 2 is an enlarged cross-sectional view taken along the line A—A in FIG. 1.
Figure 3:
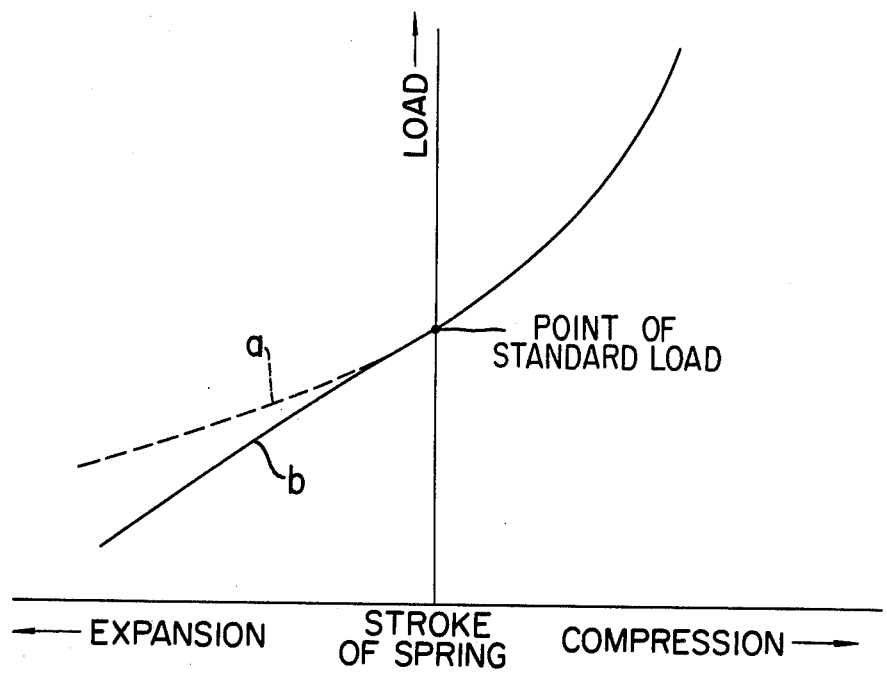
FIG. 3 is a stroke-load diagram of an air spring, illustrating the spring characteristics obtainable conventionally and in accordance with the present invention, respectively, at a and b.

The torsion bar 6a is rotatably mounted at the opposite ends thereof on the subframe 1 by means of bearings 8 and 8'. Also, the torsion bar 6a is provided with means for limiting the extent of rotation of the middle section thereof as occurring with downward movement of at least one of the wheels 5 and 5' relative to the frame of the vehicle. Specifically, a rotation controlling arm 9 is fixed to the torsion bar 6a at the middle thereof by means of a clamp member 10 (see FIG. 2), which grips the torsion bar 6a in cooperation with the base end portion of the rotation controlling arm 9 under the fastening effect of threaded bolts 11. Threadably fitted to the extreme end of rotation controlling arm 9 is an adjusting screw 13 which has an abutment plate 12 formed integral therewith. The abutment plate 12 is positioned opposite to a stop pad 14 which is provided on the top surface of a rearwardly projecting portion 1a of subframe 1 and formed of rubber or the like material. Normally maintained between the abutment plate 12 and the stop pad 14 is a definite distance l as measured under the standard loaded condition of wheels 5 and 5' by means of the adjusting screw 13 previously set in an appropriate position axially adjusted relative to the rotation controlling arm 9.

Description will next be made of the operation of the embodiment described above. First, in the event that the loads upon the wheels 5 and 5' are increased and the wheels are equally bumped or moved up with respect to the vehicle body, the rock arms 6b and 6b' of stabilizer 6, following the rocking movement of the suspension arms 2 and 2', cause the rotation controlling arm 9 to rock upwardly through the medium of the torsion bar 6a just to increase the distance 1 between the abutment plate 12 and the stop pad 14 so that the upward movement of the two wheels 5 and 5' is not obstructed in any manner by the stabilizer 6. Thus, in a higher load region, the suspension air springs, not shown, associated with the respective wheels 5 and 5' are allowed to exhibit their inherent spring characteristics.

On the other hand, when, with reduction in load, both wheels 5 and 5' rebound or move downwardly with respect to the vehicle body, the rotation controlling arm 9 is caused to rock this time downwardly and subsequently when the angle of such rocking movement reaches a preset value, the abutment plate 12 comes in abutting engagement with the stop pad 14 so that any further rocking movement of the rotation controlling arm 9 is precluded. Any continued downward movement of the two wheels 5 and 5' causes a torsion resistance to develop in the torsion bar 6a and which resistance acts to restrain any further extension of the air springs not shown. In this manner, in a low load region, the operating characteristics of the air springs are compensated with their spring rate increasing from its original to a higher value as the loads on the wheels are reduced.

Next, in cases where the load on one of the wheels 5 and 5' is increased while that on the other wheel is reduced so that the wheels 5 and 5' are moved relative to each other, for example, in the event that the left and right wheels 5 and 5' are moved up and down, respectively, as when the vehicle is turned to the right, the left and right rock arms 6b and 6b' are caused to rock relative to each other thereby to twist the torsion bar 6a and the torsional resistance thus developing in the torsion bar 6a first produces stabilizing effect against vertical movement of the two wheels 5 and 5'.

Figure 4:
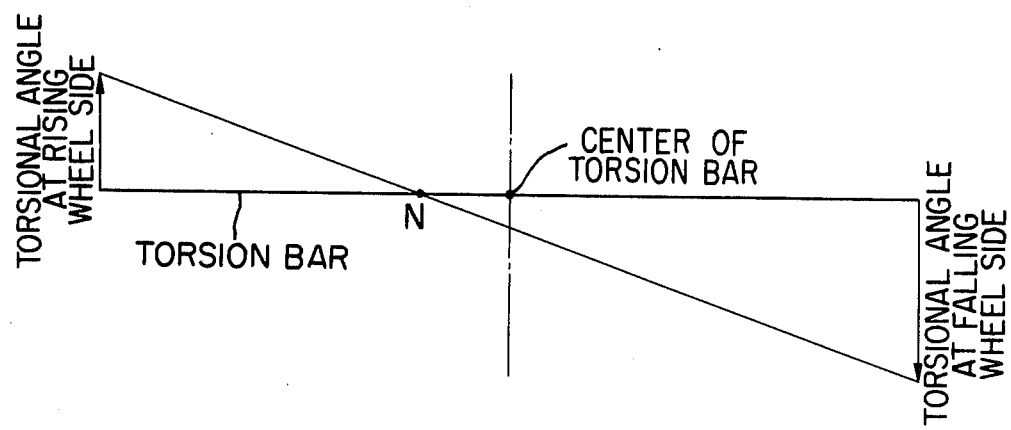
FIG. 4 is a torsion diagram of the torsion bar used in the device of the present invention, illustrating the distribution of torsional strains along the length of the torsion bar as when the right and left wheels are moved relative to each other in opposite directions.

As the change in load on each of the wheels 5 and 5' proceeds, the spring rate of the air spring associated with the left wheel 5 increases to restrain the upward movement thereof in an increasingly effective manner while the spring rate of the air spring associated with the right wheel 5' decreases to promote the downward movement of the wheel. In accordance with this, the right-hand rock arm 6b' is rocked downwardly through an angle larger than that through which the left-hand rock arm 6b is rocked upwardly so that the neutral point of torsion on the torsion bar 6a is shifted leftward from the middle point of the length thereof, as indicated at N in FIG. 4, and the rotation controlling arm 9 is rocked downwardly to cause the abutment plate 12 mounted thereon to approach the stop pad 14. Subsequently, when the difference of the amount of upward stroking movement of wheel 5 from that of downward movement of wheel 5' reaches a preset value, the abutment plate 12 is brought into abutting engagement with the stop pad 14 to restrain any further rocking movement of the rotation controlling arm 9. Acccordingly, the effective length of the torsion bar 6a associated with downward rocking movement of the right-hand rock arm 6b' is reduced and there is produced a substantial resistance to the downward rocking movement of rock arm 6b' with the result that any further downward movement of the right-hand side wheel 5' is effectively restrained. It will be recognized, therefore, that, in a low load region, even when only one or the other of the two wheels 5 and 5' is moved down relative to the vehicle body, the operating characteristic of the air spring associated with the wheel is compensated so that the spring rate is increased from its original to a higher value as the load on the wheel is reduced.

As will readily be appreciated from the foregoing description, the device of the invention is extremely simple in construction, including a single torsion bar to the opposite ends of which a pair of right and left wheels are connected through the medium of respective rock arms formed integral with the torsion bar, and, being capable of compensating the characteristics of the suspension air springs associated with the respective wheels in such a manner that increase in expanding stroke of the air springs as occurring with reduction in load applied thereto is effectively restrained, the device is highly effective to reduce the amount of "tail lift" of the associated vehicle as when suddenly braked and also to prevent any extraordinary rolling movement of the vehicle as when sharply turned and thus materially improves the driving stability of the vehicle.

Though one preferred embodiment of the present invention has been shown and described, it will be apparent to those skilled in the art that many changes and modifications may be made therein without departing from the spirit of the invention or the scope of the appended claims.

What is claimed is:

1. An apparatus for a vehicle of the type including a pair of right and left wheels suspended on the frame of the vehicle through the medium of respective air spring assemblies, and a compensating device for the air spring assemblies, employing a single torsion bar rotatably mounted on the frame transversely thereof; a pair of rock arms extending integrally from the opposite ends of said torsion bar and connected with the respective wheels; rotation limiting means for limiting rotation of the middle section of said torsion bar occuring with downward movement of at least one of the wheels with respect to the frame of the vehicle at a predetermined angular extent; said rotation limiting means including rotation controlling arm means fixed to said torsion bar at the middle thereof and extending at right angles thereto, a stopper provided on the frame of the vehicle in a position adjacent to the extreme end of said rotation controlling arm, and a distance controlling member provided on the extreme end of said rotation controlling arm in a position opposite to said stopper as to be adjustable therefrom, whereby said air spring assemblies are compensated so that upon a rebounding stroke of each of said wheels, the load on the associated wheel is reduced below a specified level, and the overall spring rate is increased by the action of said rotation limiting means in comparison with the intrinsic spring rate of each of said air spring assemblies to shorten the extension stroke of said associated wheel and reduce the rising of the center of gravity of the vehicle body.

2. An apparatus as set forth in claim 1, wherein said distance controlling member comprises an adjusting screw threadably fitted to said rotation controlling arm at the extreme end thereof and an abutment plate fixed to the tip of said adjusting screw in a position opposite to said stop pad.

* * * * *